Figure 1:
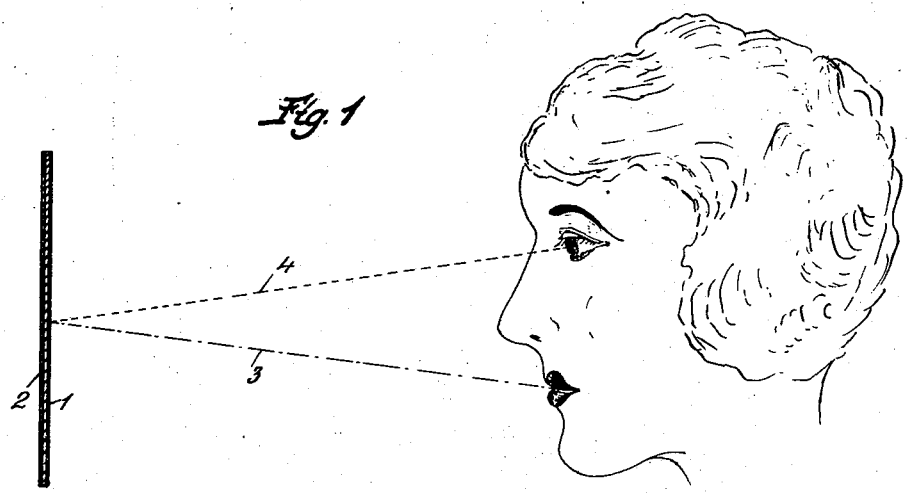

March 13, 1934.       P. SCHLUMBOHM       1,951,214
TINTED TOILET MIRROR

Filed March 27, 1933

Inventor:
Peter Schlumbohm
by Hammond & Littell Attorneys

Patented Mar. 13, 1934

1,951,214

UNITED STATES PATENT OFFICE 1,951,214

TINTED TOILET MIRROR

Peter Schlumbohm, Berlin, Germany

Application March 27, 1933, Serial No. 662,903
In Great Britain March 29, 1932

8 Claims. (Cl. 88—1)

The present invention relates to tinted toilet mirrors and is in some way a supplementary invention to the day-light effect mirror as described in my U. S. A. patent application Serial No. 612,831.

Whereas the previous invention aims at a color filter mirror showing the day light colors, especially of a woman's make-up in artificial light, it is the object of the present invention, which I may call a lamp-light effect mirror, to create the opposite effect, meaning to show in daylight the colors as they would appear in an artificially illuminated room. Here again the main purpose is to allow a woman to look at her face in order to control the make-up. The size of the mirror, however, is not limited to hand mirrors. Big wall mirrors can be of special advantage in dressmakers' shops or in hairdressing and beauty parlors to be used in daylight for showing the exact evening effects.

The best method of manufacturing such a mirror is to silver a tinted glass and thus to influence the composition of the light which is reflected from the mirror after having twice passed through the color filter on its way to and from the reflecting surface.

Following my invention the tinted glass serves as an absorption filter. A filter which answers the purpose of changing daylight into lamp-light must absorb certain spectral parts of the daylight. By choosing the correct absorbing colors and by providing a calculated concentration one could make a filter which objectively turns daylight completely into lamp-light. Such a filter would, however, not satisfy as a toilet mirror. As a result of my research work I found that when making a tinted toilet mirror the psychological factors of the human eye are most important and that in order to manufacture a practical toilet mirror with a specific absorption filter, this filter must be considerably weaker than theoretically required by mathematical physical calculations referring to a filter which would objectively change daylight into lamp light.

Daylight is characterized as having a preponderance of rays of the shorter wave lengths including violet, indigo, blue and a relatively smaller percentage of rays of the longer wave lengths including red. Artificial light as referred to herein is characterized as having a great predominance of rays of longer wave length including yellow, orange, red, and a very small percentage of rays of the shorter wave lengths including violet, indigo, blue.

Following my invention a light shade of an amber yellowish brownish filter gives satisfactory results for the purpose of a vanity mirror with reference to normal electric illumination. The mirror can be tested as to its correctness by comparing its reflection in daylight of a person's face with the reflection of a normal colorless mirror in artificial light of the same person's face. Selected by this or by other psychological tests, even known tinted glasses or other known filters may be used for making a mirror for such a new purpose as a special toilet mirror in which a person can judge in daylight her optical effect later in lamplight.

An amber tinted glass that is satisfactory for normal electric lamps as artificial sources of light can be obtained by the addition of sulphur or of selenium to a colorless ground glass, for instance, by the addition of 0.1% of sulphur to a glass mixture of the following composition:

|  | Percent |
|---|---|
| Sand | 60 |
| Soda ash | 17 |
| Limestone | 23 |

This concentration of sulphur can even be considered as the upper limit, weaker concentrations giving good results also.

Mirrors constructed according to this invention may be employed in conjunction with ordinary or other mirrors and may form a constructional part of a woman's powder box, hand bag or the like.

Mirrors constructed according to this invention are preferably provided with an undetachable statement, etched or printed thereon, indicating the purpose of the mirror.

The invention is illustrated in the accompanying drawing:

Fig. 1 illustrates a tinted glass 1 silvered at the back with a silver layer 2 and illustrates further the change of rays of light (3) coming from the face of a woman to the mirror, passing the glass 1 twice and entering as a light of changed color 4 into the eye of the woman.

Figure 2:
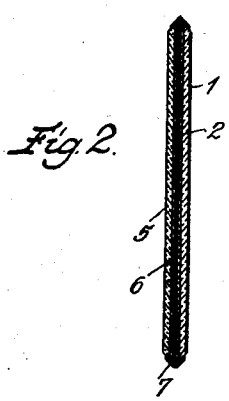

Fig. 2 illustrates a combination of an amber lamp-light-effect-mirror 1 with another mirror 5 in such a way that the silver layers 2 and 6 of the two mirrors are next to each other, while a metal frame 7 keeps the two mirrors together as one instrument. The mirror 5 may be a normal colorless mirror or a day light mirror as described in my U. S. A. patent application No. 612,-831.

Figure 3:
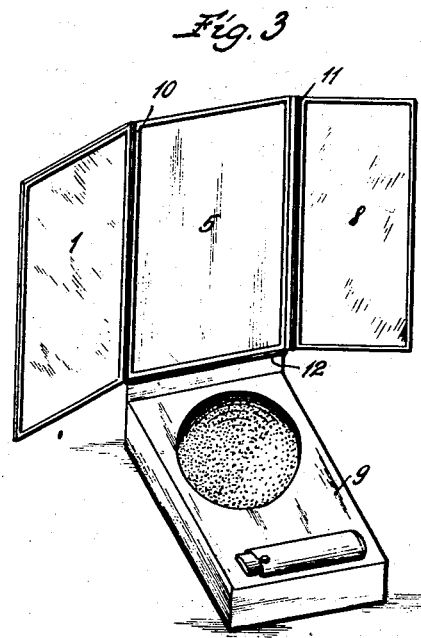

Fig. 3 shows the combination of the lamp light effect mirror 1 together with a normal colorless mirror 5 and a day light mirror 8.

The arrangement as shown in Fig. 3 is very practical because of its combination with a powder box 9, thus providing complete make-up equipment for all light condition.

The three mirrors 1, 5 and 8 are collapsible by means of the hinges 10 and 11, and all three of them after being folded together form the lid for the powder box 9, the lid being turnable by means of the hinge 12.

Figure 4:
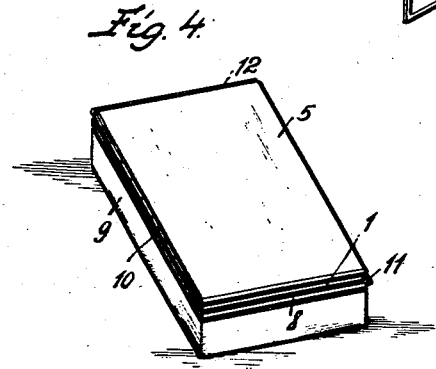

Fig. 4 illustrates the mirror equipment of Fig. 3 closed in the described manner.

A specific field for applying such lamp light effect mirrors will be in the interior equipment of an automobile, so that a woman who is driving in the day light to an afternoon tea party can see in this mirror how she will look a few minutes later in the lamp light.

Having now particularly described the nature of my said invention, and in what manner the same is to be performed, I declare what I claim is:

1. A toilet mirror of the class described, comprising a glass having a reflecting material on one side thereof, said glass having a coloring matter therein rendering the glass capable of absorbing a portion of light waves reflected from an object illuminated by daylight which contains a greater proportion of short waves to long waves than artificial light, the quantity and quality of said coloring matter being sufficient to absorb such a portion of said short waves as will cause the mirror to reflect an image of the object in light having approximately the same proportion of short waves to long waves as artificial light, whereby the image will appear the same as though the object were illuminated by artificial light and the image were seen in a normal glass.

2. A toilet mirror of the class described, comprising a glass having a reflecting material on one side thereof, said glass having a coloring matter therein rendering the glass capable of absorbing a portion of light waves reflected from an object illuminated by daylight which contains a greater proportion of short waves to long waves than artificial light, the quantity and quality of said coloring matter being sufficient to absorb such a portion of said short waves as will cause the mirror to reflect an image of the object in light having approximately the same proportion of short waves to long waves as artificial light, whereby the image will appear the same as though the object were illuminated by artificial light and the image were seen in a normal glass, said amount of coloring matter being less than the theoretical requirement determined on the spectral permeability of the glass and consisting of a small percentage of selenium.

3. A toilet mirror of the class described, comprising a glass having a reflecting material on one side thereof, said glass having a coloring matter therein rendering the glass capable of absorbing a portion of light waves reflected from an object illuminated by daylight which contains a greater proportion of short waves to long waves than artificial light, the quantity and quality of said coloring matter being sufficient to absorb such a portion of said short waves as will cause the mirror to reflect an image of the object in light having approximately the same proportion of short waves to long waves as artificial light, whereby the image will appear the same as though the object were illuminated by artificial light and the image were seen in a normal glass, said amount of coloring matter being less than the theoretical requirement determined on the spectral permeability of the glass and consisting of a small percentage of sulphur.

4. A mirror as claimed in claim 1, the glass of said mirror having approximately the formula $SiO_2$, 60%; $K_2O$, 17%; $CaO$, 23%; said glass having added thereto a relatively small percentage of sulphur.

5. As a new article of manufacture a toilet mirror of the class described, comprising a portion having coloring matter therein capable of absorbing a portion of light reflected from an object illuminated by artificial light which contains a greater proportion of rays of longer wave length than daylight so that the image of an object illuminated by artificial light will appear to have the same coloring as if the object were illuminated by daylight and seen in a clear glass, said mirror having a second portion having coloring matter therein capable of absorbing a portion of light reflected from an object illuminated by daylight which contains a greater proportion of rays of shorter wave length than artificial light so that the image of an object illuminated by daylight will appear to have the same coloring as if the object were illuminated by artificial light and seen in a clear glass, said portions being joined, beveled and finished as a single unit, said glass portions being provided with reflecting surfaces.

6. As a new article of manufacture a toilet mirror of the class described, comprising a portion having coloring matter therein capable of absorbing a portion of light reflected from an object illuminated by artificial light which contains a greater proportion of rays of longer wave length than daylight so that the image of an object illuminated by artificial light will appear to have the same coloring as if the object were illuminated by daylight and seen in a clear glass, said mirror having a second portion having coloring matter therein capable of absorbing a portion of light reflected from an object illuminated by daylight which contains a greater proportion of rays of shorter wave length than artificial light so that the image of an object illuminated by daylight will appear to have the same coloring as if the object were illuminated by artificial light and seen in a clear glass, said portions being joined, beveled and finished as a single unit, the respective portions of said mirror being mounted adjacent each other and provided with reflecting surfaces.

7. A multiple part toilet mirror of the class described, comprising a glass having a reflecting material on one side thereof, said glass having a coloring material therein rendering the glass capable of absorbing a portion of light waves reflected from an object illuminated by daylight which contains a greater proportion of short waves to long waves than artificial light, the quantity and quality of said coloring matter being sufficient to absorb such a portion of said short waves as will cause the mirror to reflect an image of the object in light having approximately the same proportion of short waves to long waves as artificial light, whereby the image will appear the same as though the object were illuminated by artificial light and the image were seen in a normal glass, and a second part to said mirror having a glass with different characteristics and a reflecting material on one side thereof.

8. A mirror as claimed in claim 1, the glass of said mirror having approximately the formula $SiO_2$, 60%; $K_2O$, 17%; $CaO$, 23%; said glass having added thereto sulphur in the amount of not more than .1%.

PETER SCHLUMBOHM.